UNITED STATES PATENT OFFICE.

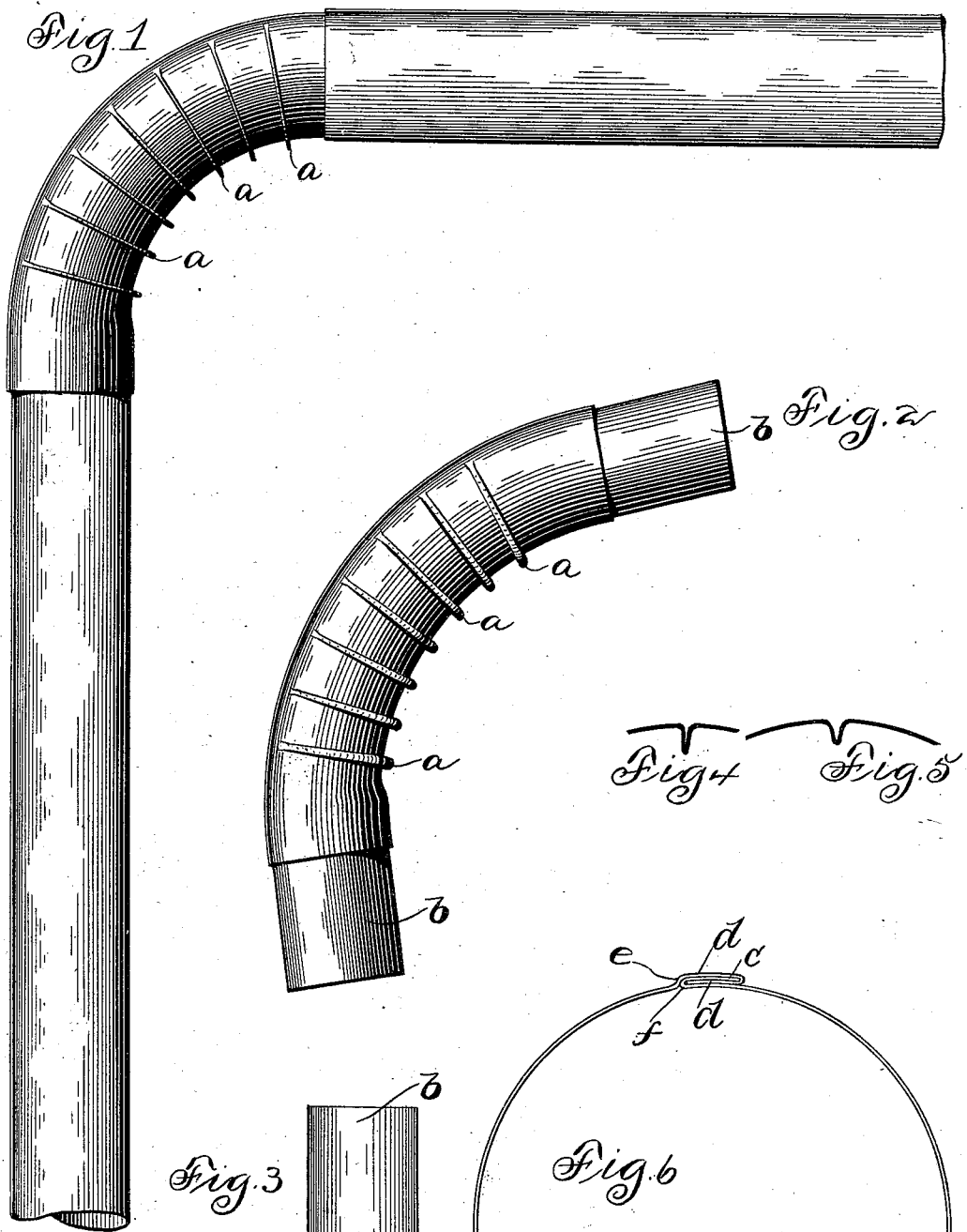

ORLANDO P. BRIGGS, OF CHICAGO, ILLINOIS, ASSIGNOR TO THE WESTERN ELECTRIC COMPANY, OF SAME PLACE.

ELBOW.

SPECIFICATION forming part of Letters Patent No. 555,494, dated March 3, 1896.

Application filed October 11, 1893. Serial No. 487,807. (No model.)

*To all whom it may concern:*

Be it known that I, ORLANDO P. BRIGGS, a citizen of the United States, residing at Chicago, in the county of Cook and State of Illinois, have invented a certain new and useful Improvement in Elbows, of which the following is a full, clear, concise, and exact description, reference being had to the accompanying drawings, forming a part of this specification.

My invention relates to sheet-metal elbows; and it has for its object the construction of an elbow for joining lengths of tubing, which will be strong and durable, and which may be so adjusted that the lengths of tubing may be joined at any desired angle.

Speaking generally, my invention comprehends a sheet-metal elbow formed of thin and flexible metal, the metal being thrown out in folds on the inner arc of the elbow, the edges of the folds being rounded instead of sharp or creased, whereby the breaking of the metal at the folds is prevented. The metal of the folds is flexible, so that the sides or walls of the folds may be moved toward or from one another to adjust the curvature of the elbow. The means which I preferably employ for thus adjusting the elbow consists in inserting in the ends thereof two plugs of sufficient length so that when inserted they may be grasped by the hands. These plugs are inserted sufficiently to support the metal and thereby prevent the collapse thereof where leverage is brought to bear upon the elbow. By manipulating the plugs the folds referred to may be caused to spread, thereby forming an elbow of a shorter segment of circle, which will connect lengths of tubing at a greater angle.

My invention will be more readily understood by reference to the accompanying drawings, in which—

Figure 1 is a side view of an elbow, showing two lengths of tubing connected at right angles thereby. Fig. 2 is a view showing an elbow adjusted to connect the lengths of tubing at an increased angle. Fig. 3 is a view of a plug which I employ for adjusting the elbow. Figs. 4 and 5 show a section of a portion of the fold before and after being flexed. Fig. 6 is a detail of the seam joining the overlapping edges of the sheet metal of which the elbow is made.

Like parts are referred to by similar letters of reference throughout the views.

A blank tube is employed in which are formed several bulges, the metal in which is afterward pressed by means of a suitable tool or machine into crescent-shaped folds $a\ a\ a$. The machine for making these bulges I have made the subject of an application for United States Letters Patent, Serial No. 487,806, filed October 11, 1893.

The bulges are formed in the blank tube in such a manner that the tube will be slightly curved in its length, when, upon the metal in the bulges being pressed together, the tube is caused to assume the shape of a quadrant or other desired segment of a circle. The shape of the elbow is preferably a quadrant when finished, as the lengths of pipe which they are designed to join are usually placed at right angles to each other. In the arrangement of the tubing it may be desired to connect certain lengths thereof at other than right angles for convenience—for instance, in getting around corners or passing through floors. It is for the purpose of thus connecting the lengths of tubing that I have invented my adjustable elbow.

In adjusting the elbow, plugs $b\ b$ or other devices are inserted in the ends thereof, which may be grasped by the hands. These plugs also serve to support the metal and keep it in shape at the point of leverage. By pressing these plugs apart—that is, by moving them in a direction which tends to bring them in alignment—the circle, of which the elbow is a segment, is increased, while the angle opposing said segment is decreased, thereby increasing the angles between the radii and segment, thus enabling the lengths of tubing to be joined at a greater angle. Such an adjusted elbow I have shown in Fig. 2.

By pressing the plugs $b\ b$ toward each other the elbow may be made to wholly regain its former shape.

In Figs. 4 and 5 is shown a fold in the elbow before and after the same is adjusted, Fig. 5 showing the manner in which a fold is spread apart after the elbow is adjusted.

In Fig. 6 I have shown in detail the seam joining the edges of the sheet metal.

The overlapping edges of the sheet metal are formed into U-shaped loops, one loop being formed outwardly, while the other is formed inwardly. A limb $c$ of one loop is inserted between the limbs $d$ $d$ of the second loop, after which the two loops are pressed together by means of a suitable machine or tool, as described in my application, Serial No. 474,023, filed May 12, 1893. To secure the seam from parting I form an offset $e$ in the overlapping edge, as shown in Fig. 6, and cause this offset to bear firmly against the bend $f$ of the corresponding loop. The seam thus formed I term a "double lock seam."

In connecting lengths of tubing it may be desirable to insert one length of tubing within one end of the elbow, while the other end of the elbow is inserted in the second length of tubing. The blank tube from which the elbow is made is formed, for the purpose of inserting a length of tubing within one end of the elbow, with an enlarged end, which may be made by the employment of a tool known as an "expander," as described in my application, Serial No. 487,806, filed October 11, 1893. This expander is made curved or tapering, so that when inserted within the end of the tube it gradually enlarges the same to the required size.

I am aware that elbows for stovepipes have been formed by throwing out folds on the inner arc of the elbow, (Letters Patent No. 128,146, dated June 18, 1872,) but the folds are not flexible, and the sides of the folds cannot be moved toward or from one another to alter the curvature of the elbow.

Having thus described my invention, what I claim as new, and desire to secure by Letters Patent, is—

As a new article of manufacture, a sheet-metal elbow formed of thin and flexible sheet metal, the metal being thrown out in folds on the inner arc of the elbow, the edges of the folds being rounded and not sharp or creased, and the metal of the folds being flexible, so that the sides or walls of the folds may be moved toward or from one another to alter the curvature of the elbow; substantially as described.

In witness whereof I hereunto subscribe my name this 18th day of July, A. D. 1893.

ORLANDO P. BRIGGS.

Witnesses:
 FLOYD T. SHORT,
 GEORGE L. CRAGG.